United States Patent [19]

Fujikawa et al.

[11] Patent Number: 4,862,981
[45] Date of Patent: Sep. 5, 1989

[54] INTERNAL COMBUSTION ENGINE AND DEVICES EMPLOYING SAME

[75] Inventors: Tetsuzo Fujikawa, Kobe; Keisuke Tomonaga, Akashi; Shinichi Tamba, Kakogawa; Hitomi Miyake, Kobe, all of Japan

[73] Assignees: Kawasaki Jukogyo Kabushiki Kaisha, Japan; Deere & Company, Moline, Ill.

[21] Appl. No.: 71,019

[22] Filed: Jul. 8, 1987

Related U.S. Application Data

[63] Continuation-in-part of Ser. No. 808,636, Dec. 13, 1985, abandoned.

[30] Foreign Application Priority Data

Dec. 24, 1984 [JP] Japan .................................. 59-275672
May 20, 1985 [JP] Japan .................................. 60-108914
May 24, 1985 [JP] Japan .................................. 60-112397

[51] Int. Cl.[4] .............................................. B60K 11/04
[52] U.S. Cl. ..................................... 180/68.4; 180/900
[58] Field of Search .................... 180/68.1, 68.4, 68.6, 180/291, 292, 294, 298, 900; 123/41.49, 41.66, 196 W, 10.1; 56/14.7, DIG. 22

[56] References Cited

U.S. PATENT DOCUMENTS

| 1,544,711 | 7/1925 | Wilson | 180/291 |
|---|---|---|---|
| 2,224,562 | 12/1940 | Wolf | 180/298 |
| 4,432,309 | 2/1984 | Hutchison et al. | 123/41.66 |
| 4,488,518 | 12/1984 | Wolfarth | 180/68.1 |
| 4,514,201 | 4/1985 | Brown | 180/68.1 |
| 4,589,379 | 5/1986 | Fujikawa et al. | 123/41.49 |
| 4,590,891 | 5/1986 | Fujikawa et al. | 123/41.11 |
| 4,681,067 | 7/1987 | Tamba et al. | 123/41.1 |
| 4,696,361 | 9/1987 | Clark et al. | 180/68.4 |

Primary Examiner—Charles A. Marmor
Assistant Examiner—Richard Camby
Attorney, Agent, or Firm—Leydig, Voit & Mayer

[57] ABSTRACT

An engine and power units employing the engine are provided which include a crankshaft oriented vertically and operatively connected to the engine, a liquid-cooled radiator arranged above the engine substantially perpendicular to the crankshaft, and a cooling fan interposed between the engine and the radiator and operatively connected to the crankshaft. The engines and power units may be employed in motor vehicles and other equipment such as electrical generators.

26 Claims, 10 Drawing Sheets

INTERNAL COMBUSTION ENGINE AND DEVICES EMPLOYING SAME

This application is a continuation-in-part application of copending U.S. application Ser. No. 808,636 filed Dec. 13, 1985, now abandoned.

TECHNICAL FIELD

This invention relates to power units and liquid cooled engines, and more particularly it is concerned with such power units and liquid cooled engines as may, by way of example, be embodied in motor vehicles and power generating units.

BACKGROUND OF THE INVENTION

In the case of gasoline engine powered mowers, it has hitherto been usual practice to mount an air-cooled engine therein to provide a motor vehicle which is low in cost, light in weight and compact in size. However, the use of air-cooled engines has given rise to problems of noise and air pollution. In view of this fact, there has in recent years been a tendency to use liquid-cooled engines in this type of apparatus.

In the art of cooling engines with liquids, such as aqueous coolant solutions and water, it has hitherto been usual practice to mount a vertically-oriented radiator in front of a liquid-cooled engine having a crankshaft oriented horizontally and extending lengthwise of the vehicle containing the engine. A cooling fan is generally placed at the rear of the radiator. One example of the liquid-cooled engines of the aforesaid construction is described in Japanese Utility Model Laid-Open No. 19299/83. The art disclosed in this document deals with the structural arrangement of a water-cooled engine mounted in a tow motor having a driver's cab, in which an engine having a crankshaft extending lengthwise of the vehicle is connected to a forward end of the transmission case. A front wheel cover extends forwardly from the engine and supports thereon a radiator which is oriented vertically.

In a motor vehicle equipped with this type of engine, the crankshaft is located in a position which is considerably lower in level than the center of a fan for cooling the radiator. As a result, an idler pulley has to be mounted at a rear portion of the cooling fan supported by the engine and a belt is trained over this pulley and a drive pulley is located at the outer periphery of the crankshaft to drive the fan. In this construction, the belt drive system is inevitably mounted in front of the engine, and auxiliary machinery is also mounted in this position in many applications because of the ease with which maintenance and inspection can be effected. This makes it necessary to mount the radiator in a position remote from the front of the engine. As a result, the engine and radiator occupy more space than is necessary, thereby making it impossible to obtain compact dimension in a motor vehicle equipped with such a liquid-cooled engine. Furthermore, the use of a belt drive system increases the production cost of a motor vehicle equipped with this type of liquid-cooled engine of the aforesaid construction. However, in the motor vehicle of the aforesaid construction, the presence of the belt drive system increases the distance between the engine and radiator and if the radiator were supported by the engine, the radiator would vibrate to such an extent damage might be caused thereto. Alternatively, if the radiator is mounted to the front wheel bracket as proposed in the document referred to hereinabove, then there is the disadvantage that the support structure for the radiator requires a complex construction. Furthermore, if the radiator were supported by the front wheel bracket and the cooling fan by the engine, mutual interference would take place between the radiator and cooling fan because the systems supporting them differ from each other. To avoid this trouble, it would be necessary to increase slightly the tip clearance between the outer periphery of the cooling fan and the fan duct. However, this places limitations on the efficiency with which the cooling fan can operate to perform its function. Additionally, the use of a belt drive system for transmitting drive force from the crankshaft to the cooling fan might cause overheating to occur in the engine due to possible loosening of the belt.

Accordingly, there is a need for an improved liquid-cooled power unit which significantly reduces the amount of space that the engine and radiator occupy and one which is easily installed in a vehicle or enclosure as a unit. A need also exists for a liquid-cooled power unit which eliminates the need for a belt to drive the cooling fan and which additionally reduces engine noise and exhaust pollutants.

SUMMARY OF THE INVENTION

The present invention is directed to an improved power unit, and to machinery employing such power units, such as motor vehicles and generators. The improved power unit of the present invention comprises an engine having a substantially vertically oriented crankshaft and a radiator mounted substantially horizontally above the engine, perpendicular to the crankshaft. A cooling fan is operatively attached to the crankshaft, positioned between the radiator and the engine. In addition, the radiator and the engine are preferably interconnected such that the radiator is supported by the engine. The resulting power unit may be easily assembled and installed in a vehicle or another enclosure as a unit.

This invention has the objective of overcoming the aforesaid disadvantages of the prior art. The outstanding features of the invention enabling the aforesaid object to be accomplished include the following: mounting an engine in such a manner that a crankshaft is oriented vertically, arranging a liquid-cooled radiator horizontally above the engine in a space defined by an enclosure, such as a hood or a bonnet, and securing the radiator to the engine, and arranging a cooling fan between the radiator and the engine directly connected to the crankshaft and driven thereby.

The present invention provides a liquid-cooled engine which may be embodied in a power unit (a self-contained power plant including an internal combustion engine and carburetion, cooling, and electrical systems) or used in engine driven devices such as 5 electrical generators, front mounted mowing machines, riding mowers, rear engine riders, riding mowers, farm tractors, engine powered lawn and garden maintenance equipment, engine powered recreational equipment, golf carts, golf course care equipment, and construction equipment such as tractors, backhoes, excavators, trenchers, and pumps and any device employing a power unit.

The present invention may be embodied in a number of different types of liquid-cooled engines. Thus, the engines of the present invention include those employing different types of fuel, such as gasoline and diesel powered engines, those varying in the number and arrangement of the "cylinders" such as single-cylinder engines, in-line and V-configuration multi-cylinder engines, and rotary engines, 2-cycle engines, and 4-cycle engines.

The power units and engines of the present invention provide a number of features distinguishing them from and advantages over conventional power units and engines. In particular, the engines of the present invention are easily assembled into self-contained power units which may be easily installed in vehicles such as those described above. The engines and power units of the present invention are generally quieter running, provide improved fuel efficiency, and have a more compact size as compared to conventional engines. As a result, the cost of manufacturing is lower and these engines and power units provide a higher power density, i.e., they provide a greater amount of power per unit of volume of the engine, as compared to conventional engines.

The primary objective of the present invention, therefore, is to provide an improved power unit, comprising an engine and a radiator, which significantly reduces the amount of space required to mount such a power unit and which can be manufactured as self-contained units that are easily assembled, disassembled, installed, and removed from vehicles or any device requiring such a power unit. It is also an object of the present invention to provide a power unit which, when compared to a conventional unit, has a higher power density, is quieter running, and provides improved fuel efficiency.

These and other objects and advantages of the present invention will be apparent from the following description, accompanying drawings, and the appended claims.

DESCRIPTION OF THE PREFERRED EMBODIMENTS

Figure 1:
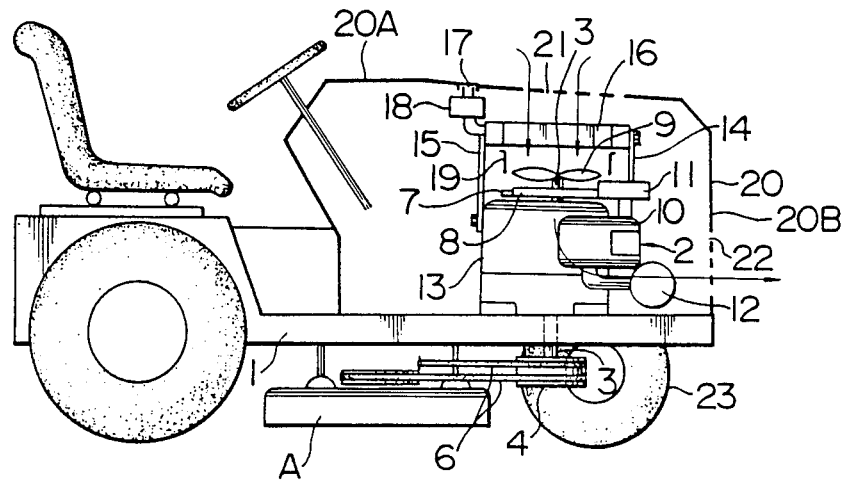
FIG. 1 is a side view, with certain parts omitted, of a motor vehicle comprising a first embodiment of the invention.

FIG. 1 shows one embodiment of the power unit of the present invention mounted, by way of example, in a lawn tractor. In this embodiment, the tractor comprises a frame 1 of a chassis supporting an engine 2 thereon, and a mowing machine A attached to the bottom surface of the frame 1.

The engine 2 which is of a V-type and arranged vertically has a crankshaft 3 extending downwardly through the frame 1 so that a lower end portion thereof supports a drive pulley 4 under the frame 1. A transmission belt 6 is assembled over the drive pulley 4 to transmit drive force from the engine 2 to the mowing machine A.

An upper end portion of the crankshaft 3 supports at its base a flywheel 8 having a ring gear 7 for the starter and at its upper end a cooling fan 9 of the axial flow type.

In this V-type engine, a cylinder head cover 10 is mounted in a manner to spread forwardly. The reference numerals 11 and 12 designate an air cleaner and muffler, respectively. The muffler 12 is located forwardly downwardly of the engine 2.

The engine 2 has a crankcase 13, and a front bracket or stay 14 and a rear bracket or stay 15 are secured to the front and rear ends, respectively, of an upper portion of the crankcase 13 and extend vertically to support a radiator 16 at their upper ends. The radiator 16, which is oriented horizontally, has connected to one end thereof a reserve tank 18 formed with a liquid feeding port 17. A fan duct 19 surrounding the cooling fan 9 projects from the bottom of the radiator 16.

The reference numeral 20 designates an enclosure for the engine formed at a top wall 20A thereof with cooling air inlet apertures 21 and at a front wall 20B thereof with cooling air outlet apertures 22. The cooling air inlet and outlet apertures 21 and 22 are located such that air currents introduced through the inlet apertures 21 into a space defined by the enclosure 20 flow in the vicinity of the engine 2 to effect ventilation and are discharged through the outlet apertures 22 in a direction in which the air currents keep dead leaves and dust blown up by the vehicle and mowing machine A during operation from flowing toward the cooling air inlet apertures 21.

In the aforesaid construction, the liquid-cooled engine 2 is mounted in such a manner that the crankshaft 3 is oriented vertically, and the radiator 16 supported by the engine 2 is located above the engine 2. This arrangement allows the radiator 16 to be disposed above the usually flat top surface of the engine 2, not in the front or at the side of the engine 2 where in many applications auxiliary machinery is mounted, thereby enabling a compact size to be obtained in the engine 2 including the radiator 16. The arrangement whereby the cooling fan 9 is directly supported by the crankshaft 3 eliminates the need to use a belt drive system employed in motor vehicles of the prior art, thereby significantly further reducing the size of the engine and power unit.

With this compact arrangement and with the radiator 16 supported by the engine 2, the vibration of the radiator 16 can be minimized and the radiator 16 can be stably supported with a minimized risk of damage thereto.

The radiator 16 and cooling fan 9 are both supported by components of the engine 2 such that mutual vibration between them is prevented. This allows the tip clearance between the fan duct 19 and cooling fan 9 to be set at a low level, to thereby increase the operating efficiency of the cooling fan 9. The arrangement whereby the cooling fan 9 is directly supported by the crankshaft 3 eliminates the risk that a loose belt might cause the engine 2 to overheat as has hitherto been the case with motor vehicles using power units of the prior art.

As described hereinabove, the cooling air inlet apertures 21 are formed at the top wall 20A of the enclosure 20 to introduce cooling air currents into the space defined by the enclosure 20. Since the inlet apertures are located at such an elevated position, entry of foreign matter, such as grass clippings or dirt, into the engine compartment is substantially reduced, thereby minimizing the risk that the radiator 16 might become clogged with debris.

The air currents thus introduced through the cooling air inlet apertures 21 are directed toward the muffler 12 and toward the cooling air outlet apertures 22 located at the front wall 20B of the enclosure 20 from which they exit the enclosure. This makes it possible for the air currents to cool the muffler 12. In addition, the air currents released through the outlet apertures 22 blow away dust and dead leaves which the front wheels 23 cause to rise and float in the air in front of the vehicle. This minimizes the risk that foreign matter might be introduced through the cooling air inlet apertures 21 into the space or engine compartment defined by the enclosure 20. In the embodiment shown in FIG. 1, the cooling air currents flow downwardly in the space defined by the enclosure 20 from above the radiator 16. However, the invention is not limited to this specific direction of flow of the cooling air currents, which may be made to flow upwardly from below the radiator 16 or from another direction.

Figure 2:
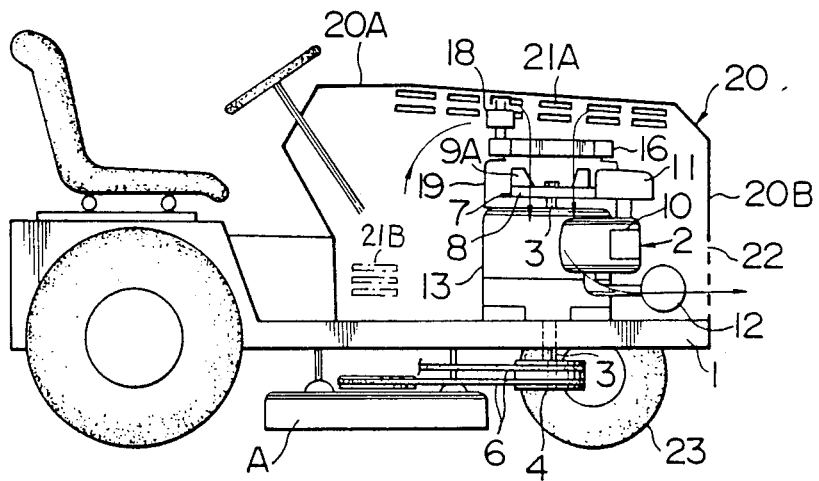
FIG. 2 is a side view, with certain parts omitted, of a motor vehicle comprising another embodiment of the invention.

FIG. 2 shows another embodiment of the invention in which parts similar to those shown in FIG. 1 are designated by like reference characters. In the embodiment shown in FIG. 2, a centrifugal fan 9A is used as a cooling fan, and cooling air inlet apertures 21A are formed at the upper portions of side walls of the enclosure 20.

In an alternate construction, cooling air currents also may be introduced into a space defined by the enclosure 20 through openings formed in a lower positions of the side walls of the enclosure. These openings provide a means for removal of grass of a relatively large size and the air from which the grass is removed enters the engine compartment and changes its flow direction to flow toward the upper surface of the radiator. As a result, a means is also provided for removal of small grass particles and other debris which may tend to settle on the upper surface of the radiator. Thus, a problem in which the performance of the engine in an apparatus used in an agricultural or mowing environment, where a large volume of debris which tends to accumulate and clog a radiator, is overcome by arrangement of inlet and outlet apertures. Furthermore, the positions of groups of air inlet openings may be selected individually or in combination to vary the direction of flow.

To simplify construction, the fan duct or shroud 19 or 19A located below the radiator 16 may be made to serve concurrently as a support for the radiator 16. The invention can have application in a motor vehicle as, for example, a motor driven mower of the type which has an engine compartment located either forwardly or rearwardly of the mowing machine A.

A further illustration of the power unit of the present invention installed in a vehicle will be described by referring to FIGS. 3, 4, and 5.

Figure 3:
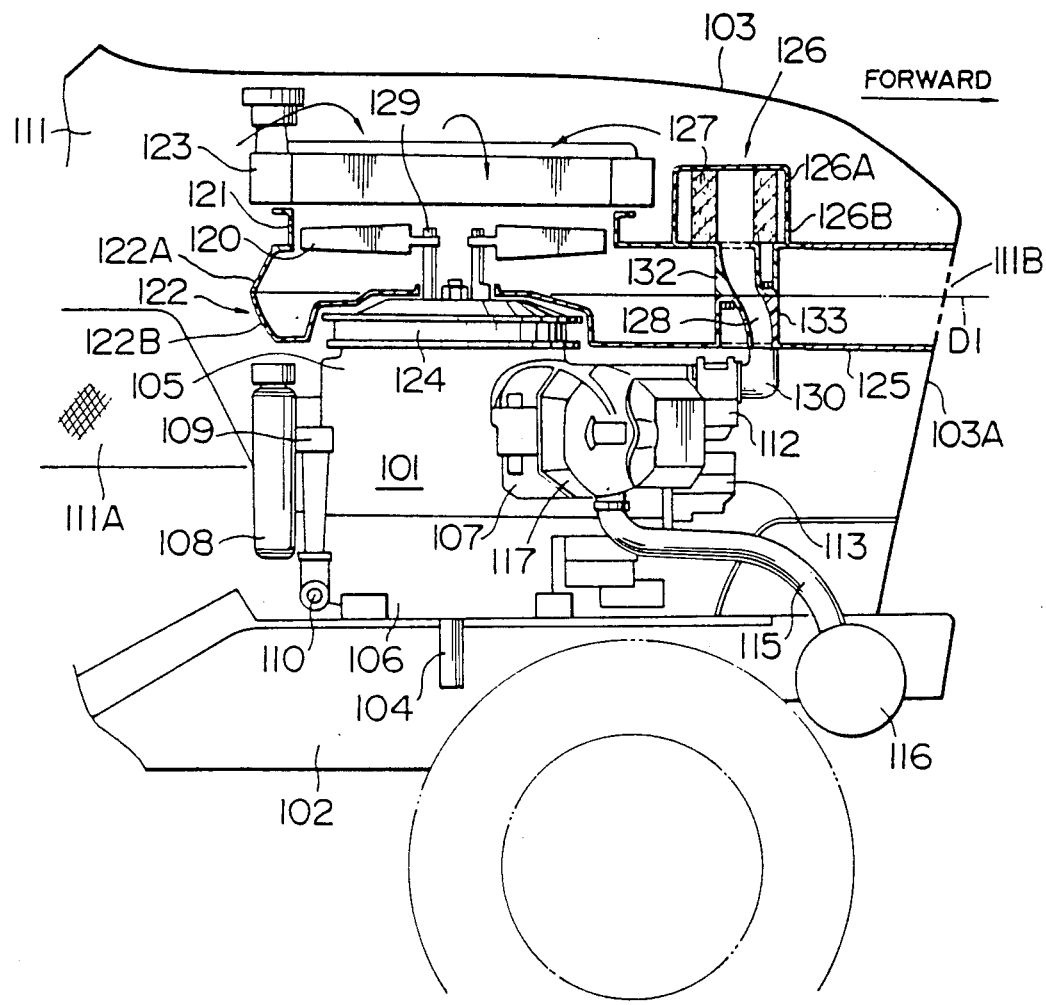
FIG. 3 is a side view, with certain parts omitted, of the essential portions of a motor vehicle comprising still another embodiment of the invention.
Figure 4:
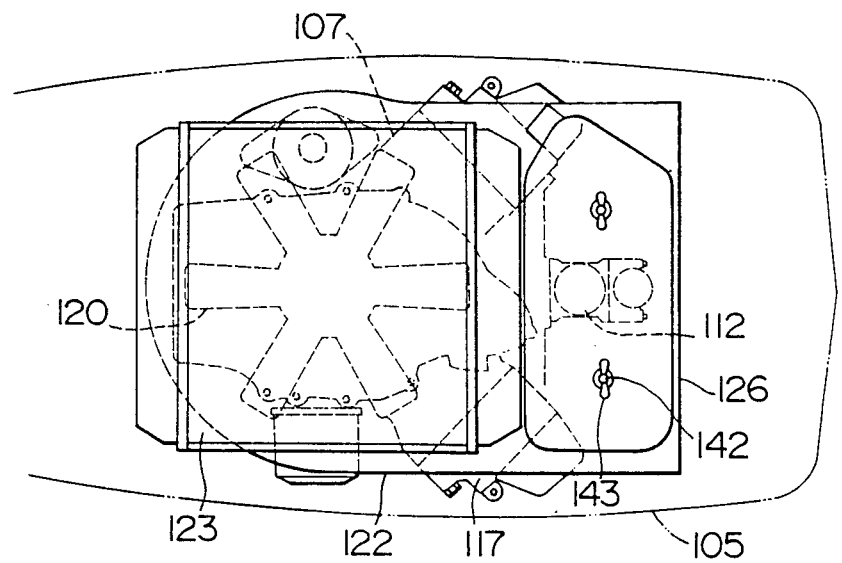
FIG. 4 is a plan view of the motor vehicle shown in FIG. 3, showing the enclosure in phantom lines.

As shown, an engine 101 mounted on a front axle bracket 102 of the vehicle is disposed in a space defined by an enclosure 103 and has a crankcase 105, an oil pan 106, a crankshaft 104 which is oriented vertically, and as shown in FIG. 4, a pair of cylinders 107 arranged in the form of a letter V when viewed from above. A reserve tank 108 for coolant such as water, an oil supply or feed port 109, and an oil drain on outlet 110 are located rearwardly of the engine 101, and a carburetor 112 and a fuel pump 113 are located forwardly of the engine 101. An exhaust pipe 115 connected to a cylinder head 117 extends forwardly and is connected to a muffler 116 at a lower portion of a front wall 103A of the enclosure 103. The enclosure 103 has cooling air inlet apertures formed at it top wall and side walls. As shown in FIG. 3, cooling air inlet apertures 111A are formed at both sides of a dashboard 111 in addition to the cooling air inlet apertures formed, as described hereinabove, at the top and side walls of the enclosure 103 (not shown in FIG. 3).

Located above the engine 101 is a fan 120 for cooling a radiator 123. The fan is supported by an extension bracket 129 secured to a flywheel 124. A shroud 121 surrounds the fan 120, and a duct 122 provided for exhausting the air flowing through the radiator is located below the shroud 121. The radiator 123 which is oriented horizontally is located above the fan 120 and is resiliently supported by the crankcase 105 through a plurality of brackets and rubber members, not shown. The duct 122 is resiliently supported on the top surface of the crankcase 105 through a resilient member, not shown, which may be formed of rubber. The duct 122 which extends forwardly is composed of a rearward duct portion of semicircular form and a forward duct portion of rectangular form and is connected, at its foreward end, to a duct portion 125 of the enclosure 103 which is maintained in communication with the atmosphere via cooling air outlet apertures 111B formed at the front wall 103A of the enclosure 103. The top surfaces of the crankcase 105 and cylinders 107 are shielded by the duct 122 from air currents that have cooled the radiator 123 and become warm. The duct 122 which is preferably formed of synthetic resinous material may be split, as shown, into an upper duct portion 122A and a lower duct portion 122B at a horizontal plane $D_1$. The shroud 121 is preferably formed of synthetic resinous material integrally with the upper duct portion 122A of the duct 122. Flanges at the outer peripheries of the upper and lower duct portions 122A and 122B of the duct 122 are joined together by a plurality of bolts, not shown.

An air cleaner 126 is located on the top surface of the outer periphery of the forward duct portion of the duct 122 in a position above the carburetor 112 and adjacent the forward end of the radiator 123. Arranged in the air cleaner 126 is an air filtering element 127 having an inner peripheral portion which is maintained, via a suction passageway 128 extending substantially vertically through the duct 122, in communication with an intake pipe 130 which in turn is maintained in communication with the carburetor 112.

Figure 5:
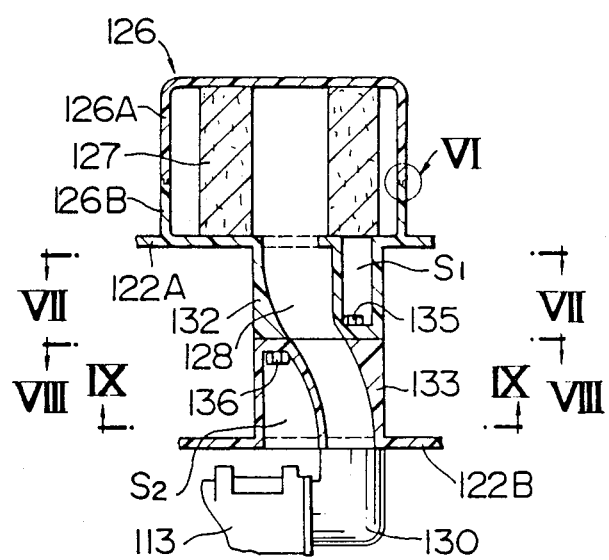
FIG. 5 is a sectional view, on an enlarged scale, of the air cleaner and its vicinity shown in FIG. 3.
Figure 6:
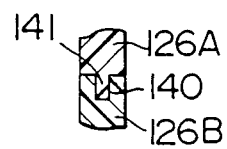
FIG. 6 is a sectional view, on an enlarged scale, of a portion of FIG. 5 designated by the arrow VI in FIG. 5.

Referring to FIG. 5, the air cleaner 126 is split into an upper case portion 126A and a lower case portion 126B. The lower case portion 126B is preferably formed of synthetic resinous materials integrally with the upper duct portion 122A of the duct 122. The lower case portion 126B is preferably formed at its top surface with a groove 140 shown in FIG. 6, and a projection 141 adapted to be snugly fitted in the groove 140 is formed at the bottom surface of the upper case portion 126A. The upper case portion 126A and lower case portion 126B are joined together to provide a unitary structure as the projection 141 is fitted in the groove 140 and bolts 142 and nuts 143, shown in FIG. 4, are fastened together.

A wall defining the suction passageway 128 shown in FIG. 5 is split into an upper-half wall portion 132 and a lower-half wall portion 133. The upper-half wall portion 132 is preferably formed of synthetic resinous material integrally with the upper duct portion 122A of the duct 122, and the lower-half wall portion 133 is preferably formed of synthetic resinous material integrally with the lower duct portion 122B of the duct 122. The suction passageway 128 is curved in such a manner that it is preferably disposed progressively nearer to the forward end of the duct 122 in going from top to bottom.

The upper-half wall portion 132 and lower-half wall portion 133 of the wall defining the suction passageway 128 are preferably of double wall construction. The upper-half wall portion 132 is formed with a heat insulating air layer or cavity S1 interposed between two walls in front of the suction passageway 128, and the lower-half wall portion 133 is formed with a heat insulating air layer or cavity S2 interposed between two walls at the rear of the suction passageway 128. The upper-half and lower-half wall portions 132 and 133 are joined together by a pair of bolts 135 and 136 disposed in front and at the rear, respectively, of the suction passageway 128. The front bolt 135 is inserted into the air layer S1 from above, and the rear bolt 136 is inserted into the air layer S2 from below. The provision of the two air layers S1 and S2 prevents air in the suction passageway from being influenced by air currents in the duct 122 that have cooled the radiator 123 and become warm.

Figure 7:
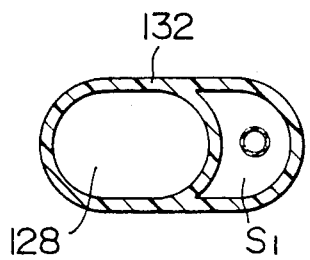
FIG. 7 is a sectional view taken along the line VII—VII in FIG. 5.
Figure 8:
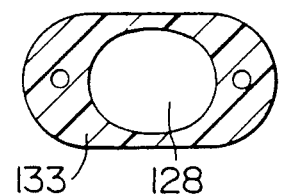
FIG. 8 is a sectional view taken along the line VIII—VIII in FIG. 5.
Figure 9:
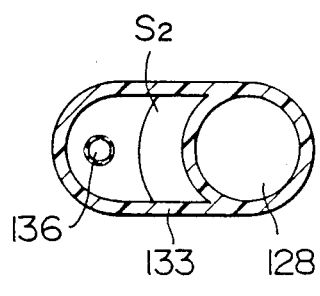
FIG. 9 is a sectional view taken along the line IX—IX in FIG. 5.

FIGS. 7 and 9 show in cross section the upper-half wall portion 132 and the lower-half wall portion 133, respectively, of the wall defining the suction passageway 128 at the outermost wall. It will be seen that the two wall portions 132 and 133 are elliptic in cross sectional form and each have a major dimension oriented lengthwise of the duct 122. FIG. 8 shows in cross section the upper end of the lower-half wall portion 133.

Figure 10:
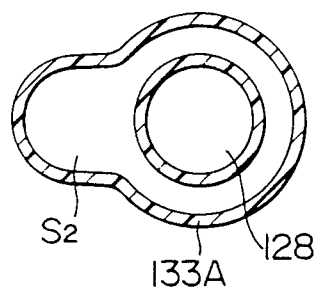
FIG. 10 is a sectional view of a modification of the suction passageway.
Figure 11:
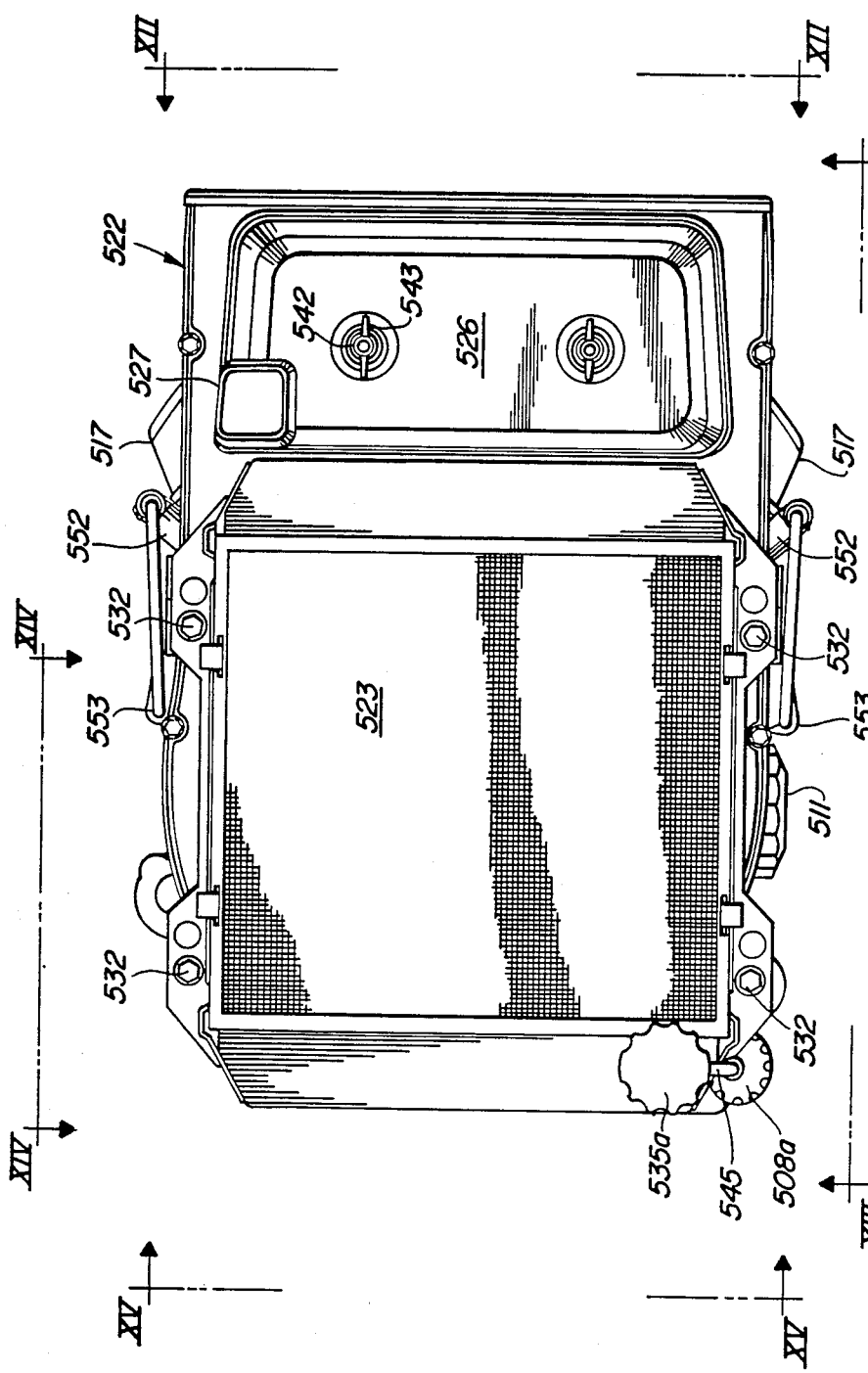
FIG. 11 is a plan view of an embodiment of a power unit according to the present invention.
Figure 12:
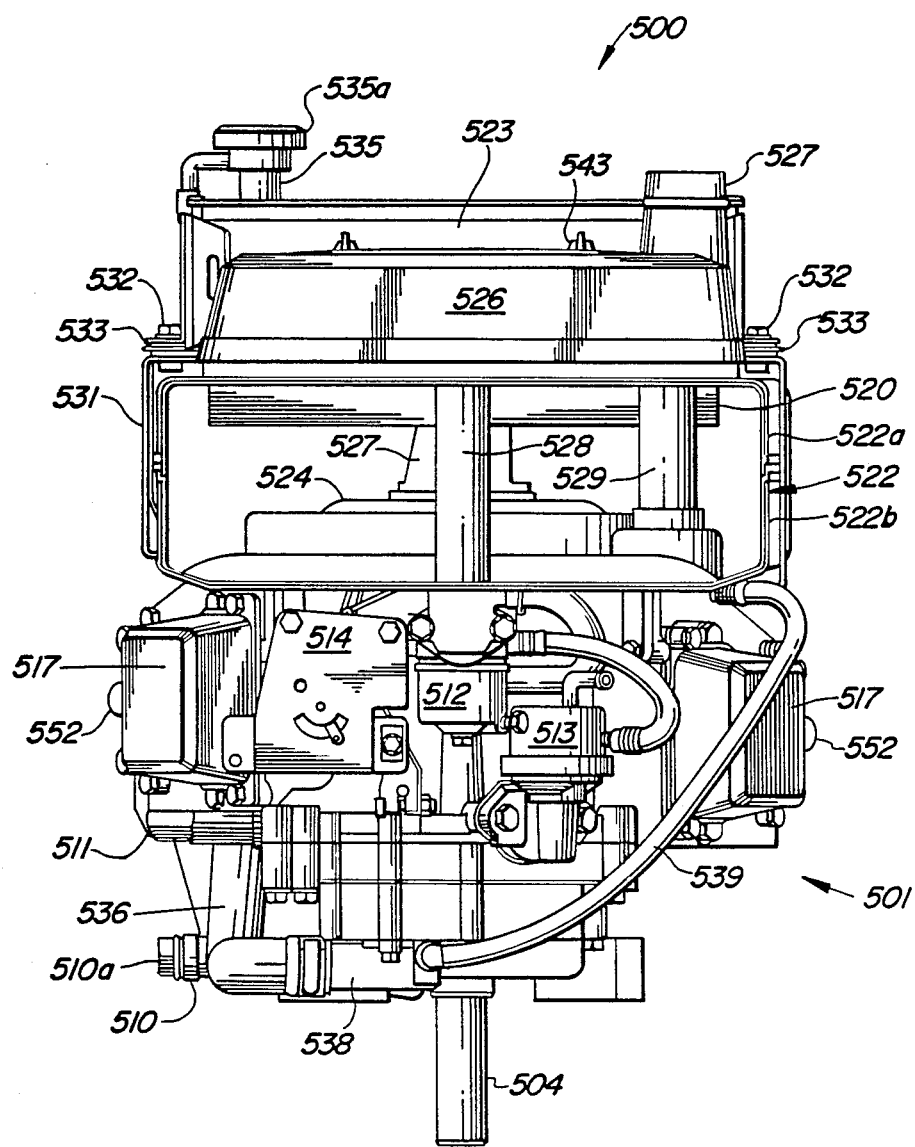
FIG. 12 is a front view of a power unit taken from the position XII—XII of FIG. 11.
Figure 13:
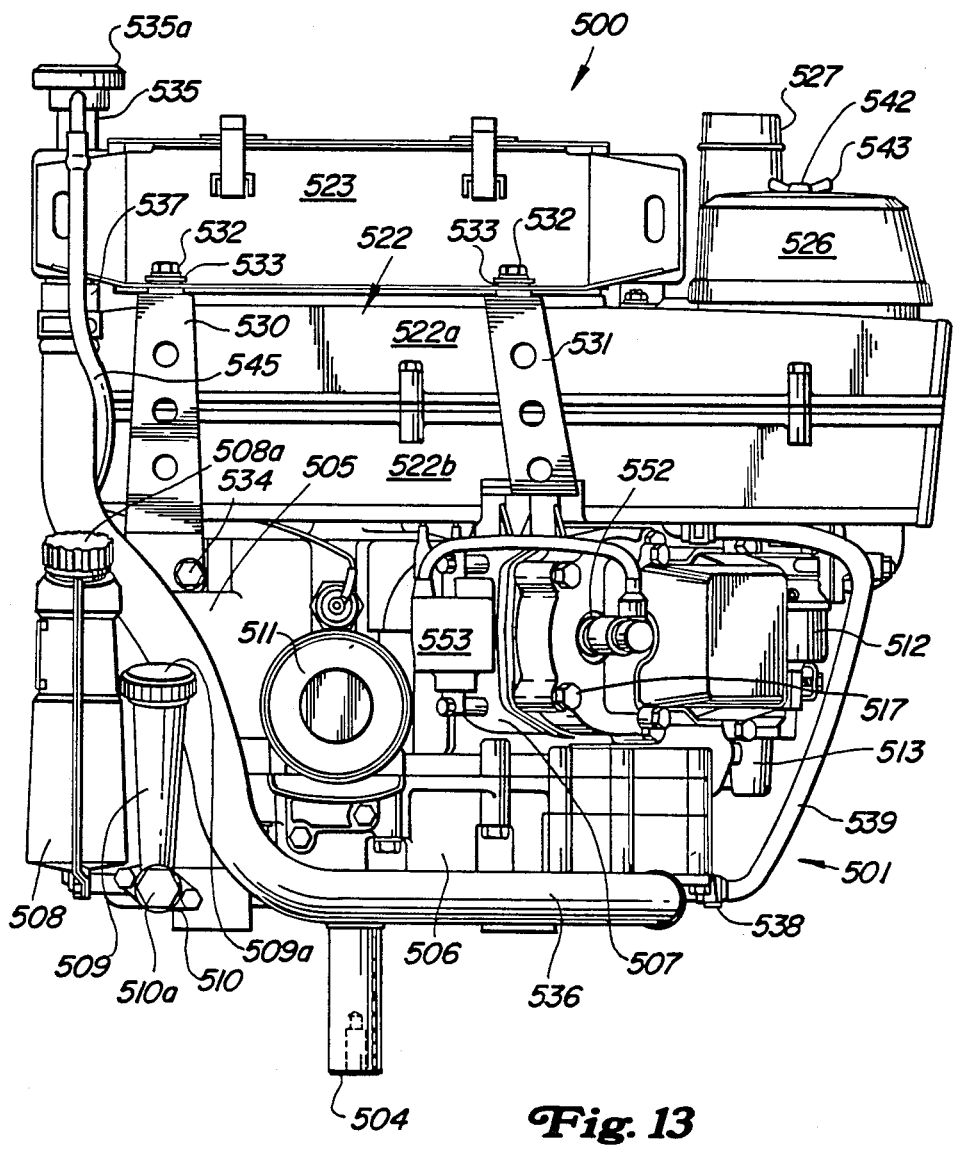
FIG. 13 is a side view of a power unit taken from the position XIII—XIII of FIG. 11.

The embodiment shown in FIG. 10 shows a wall 3A of the suction passageway 128 formed as a double wall through the entire circumferential extent of 360 degrees.

Currents of air drawn by suction through the cooling air inlet apertures formed at the enclosure 103 and/or the cooling air inlet apertures 111A formed at the dashboard 111 flow downwardly from above in a space defined by the enclosure 103 to cool the radiator 123 and then flow into the duct 122 via the shroud 121 as the fan 120 is actuated. In the duct 122, the air currents flow forwardly and are released to the atmosphere via the duct portion 125 and cooling air outlet apertures 111B of the enclosure 103. Thus, the air currents that have cooled the radiator 123 and become warm flow substantially horizontally above the engine 101 without coming into contact therewith in a direction oriented forwardly, so that the warm air currents can be discharged to outside from the enclosure 103 without thermally affecting the engine 101.

Figure 16:
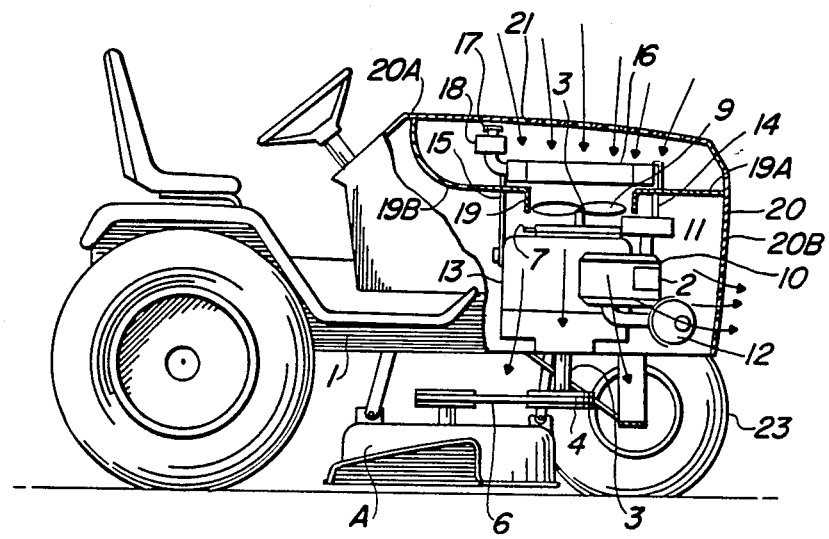
FIG. 16 is a side view, with certain parts omitted, of a motor vehicle comprising another embodiment of the invention.

FIG. 16 illustrates another embodiment of the present invention in which air currents that have cooled the radiator 16 flow downwardly, contacting the engine 2, and out of the engine enclosure 20 through openings provided in the bottom of the enclosure. A positive downward pressure is created within the engine enclosure 20 by means of the fan 9 in conjunction with a partitioning means, such as a baffle, which separates the engine enclosure into upper and lower regions. The partition means extends from the fan duct 19 to the enclosure 20 with a front baffle portion 19A extending horizontally to the front wall of the enclosure and a rear baffle portion 19B extending rearwardly and upwardly to the top wall portion 20A of the enclosure 20. In this arrangement, air enters the enclosure 20 through inlet apertures 21 located in the top wall 20A. The air is drawn through the radiator 16 by fan 9 located within the fan duct 19 and passes the air downwardly around the engine 2. In the embodiment shown in FIG. 16, openings or outlet apertures are provided in the bottom of the enclosure 20 and/or at the lower forward portion of the front wall 20B. After passing in the vicinity of the engine, the air flows around the muffler 12 and out the bottom of the engine enclosure and lower forward portion of the front wall 20B. The partition means 19A, 19B prevents upward movement of air currents after passing through the radiator and assists in creating a positive downward pressure which eliminates updrafts from the ground through the open bottom of the engine enclosure and any tendency to carry debris and cause its deposit on the engine or components operatively associated therewith.

In accordance with a further aspect of the present invention, FIGS. 11 to 15 illustrate a power unit 500 similar to that included in the vehicle illustrated in FIGS. 3 and 4. The power unit includes an engine 501 having a crankcase 505 and oil pan 506. The engine has a V-twin cylinder configuration having cylinders 507 which includes cylinder heads 517. The engine powers a vertically oriented crankshaft 504 having mounted at its upper end a flywheel (not shown) and fan 520. Mounted over the fan with a horizontal orientation is a radiator 523. The radiator is supported by the engine by support means such as rear brackets 530 and front brackets 531 which are secured at their upper ends to the radiator by bolts 532 and resilient bushings, such as rubber grommets 533. The brackets are secured at their lower ends by means of bolts 534 (shown only for the front brackets). An enclosure such as a duct or shroud 522, which includes upper and lower duct portions, 522A and 522B, respectively, surrounds the fan 520 and the flywheel. The lower duct portion 522B includes a center portion 524 which covers the flywheel. The fan 520 and the flywheel are spaced from one another by a spacer 527. The duct extends from the rear of the engine in a forward direction to just beyond the front of the engine where it is open to the atmosphere. In the particular embodiment shown, the power unit 500 may be installed in a vehicle or other device such as a generator which includes an enclosure having openings, such as louvers, a grill work, or like apertures located immediately in front of the forward open end of the duct 522. Alternatively, depending upon the application of the power unit, the forward end may be closed or restricted in some manner and openings may be placed elsewhere in the duct or between the radiator 523 and the duct 522. Located forward of the radiator and immediately above the duct 522 is an air filter housing 526 containing therein an air filter (not shown). An air inlet 527 is provided in the air filter housing 526. The filter housing 526 may be formed as separate portions, such as upper and lower portions, or the upper surface of the duct 522 may form the base of the housing and an air filter cover element may be sealingly secured to the base. The separate portions of the air filter housing 526 may be secured to one another by suitable securing means, such as bolts 542 extending from the lower portion or base of the air filter housing through apertures placed in the upper portion of the air filter housing, with nuts, such as wing nuts 543, threaded onto the projecting ends of the bolts 542.

The power unit 500 of the present invention, as the engines of the present invention, may be diesel or gasoline fueled. The embodiment illustrated in FIGS. 11 to 15 is gasoline fueled and includes a carburetor 512 supplied by a fuel pump 513, although gravity feed from an elevated fuel tank may be employed in some instances. Air is supplied to the carburetor through air inlet 527, air filter housing 526, containing an air filter, and an air intake passage 528 which provides fluid communication for filtered air between the air filter housing 526 and the carburetor 512. A throttle means, such as throttle plate 514, is used to control the volume of fuel mixture transferred to each cylinder. In some instances it may be desirable to use other carburetion means, such as fuel injection.

The lubrication system includes an oil sump and appropriate channels of conventional type are provided. Filtration of oil is accomplished by means of oil filter 511, preferably of the screw-on type. Oil may be added through an oil inlet or feed port 509, having a cap 509A at the inlet end of the port. An oil drain port or outlet 510 is provided at a lower portion of the crankcase. A closing means, such as a threaded bolt 510A, is employed at the outlet end of the drain port.

In addition to the radiator 523 arranged horizontally above the engine, the cooling system includes a coolant inlet or filler tube 535 located at one end of the radiator 523. A closure means, such as a snap-on or screw-on cap 535A, is placed over the open end of the coolant inlet. A conduit means, such as a hose, 536 serves to provide fluid communication for coolant between a radiator outlet 537 and a coolant pump, such as a "water pump", 538. Coolant passes from the engine to the radiator through similar conduit means and a thermostat housing placed in series. A coolant bypass conduit 539 is provided for fluid communication between the water pump 538 and the thermostat housing 529. A coolant reservoir or overflow tank 508 having a closure means 508A is arranged in fluid communication with the inlet end of the coolant filler tube 535 by means of a conduit, such as a flexible hose, 545.

Figure 14:
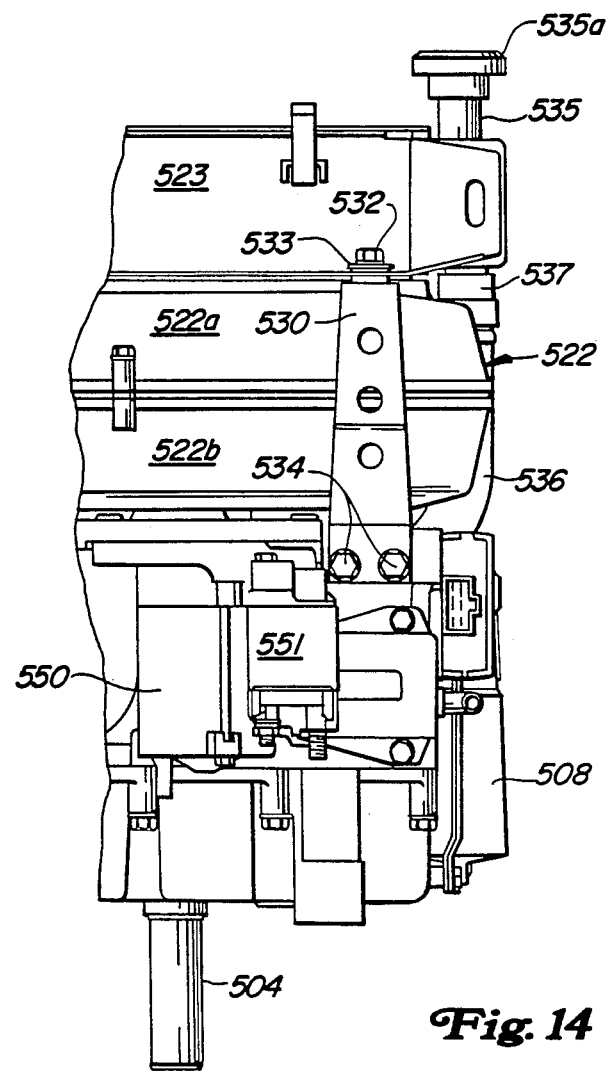
FIG. 14 is a side view of a portion of the power unit shown in FIG. 11 and taken from the position XIV—XIV.
Figure 15:
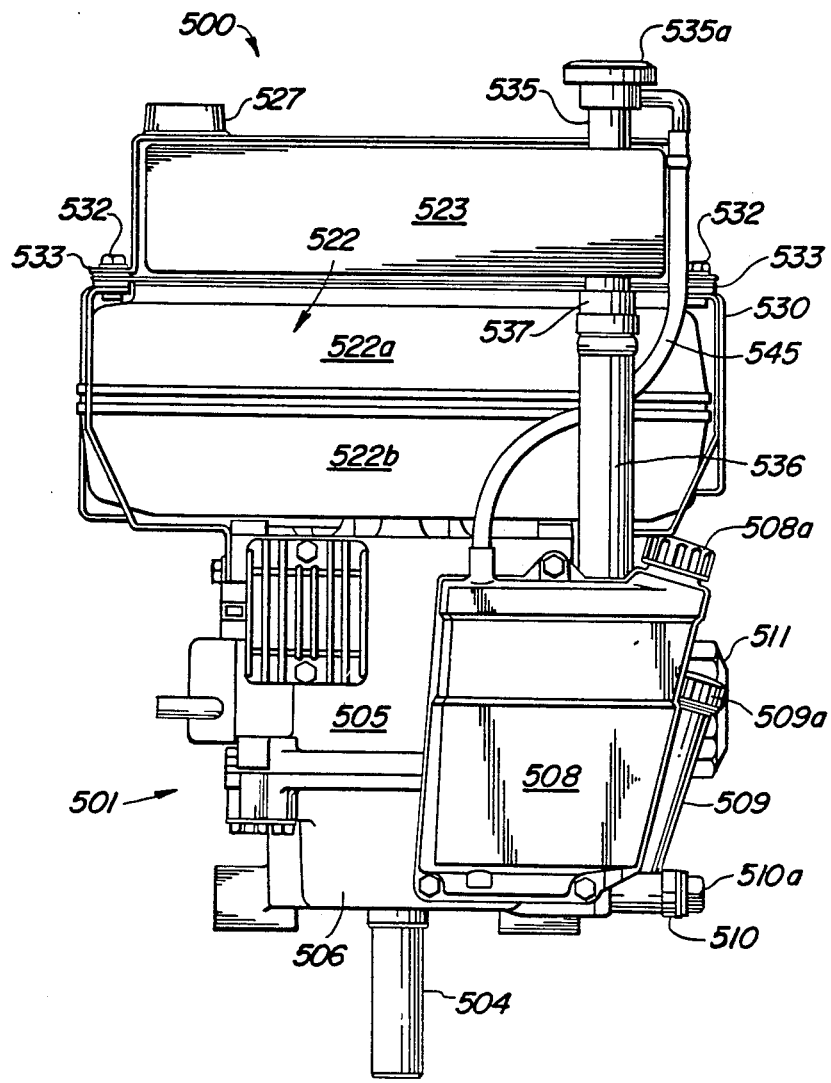
FIG. 15 is a rear view of the power unit shown in FIG. 11 and taken from the position XV—XV.

The starting system includes a starting motor 550 and solenoid 551, shown in FIG. 14. A spark is provided to each cylinder by means of individual spark plugs 552 and coils 553.

The embodiment of the present invention in which a radiator is placed above the engine results in an engine, or more particularly, a power unit, of greatly reduced total volume. Correspondingly, the volume of the engine compartment or enclosure may be reduced. This may permit in many motor vehicles the operator's field of view or the volume of the operator's compartment to be increased.

Concomitantly, the more compact engine or power unit which includes the vertical crankshaft engine with a radiator placed above the engine and a fan positioned therebetween produces a high power density. Thus, this engine and power unit produces more power per unit of volume than conventional liquid-cooled horizontally oriented crankshaft engines.

Embodiments of the present invention provide quieter running and improved fuel efficiency and appearance. Thus, the engines and power units of the present invention, which employ air conveying ducts as described above, reduce the noise caused by the operation of the fan. This duct also serves to improve the general appearance of the engine since fewer of the collateral components of the engine, such as cables, tubing, etc., are visible. The fuel efficiency of the vertically oriented liquid-cooled engine of the present invention at least equals, if not exceeds, the efficiency of conventional horizontally oriented crankshaft engines of similar cylinder displacement.

The arrangement of a horizontal radiator disposed above and supported by a vertically oriented crankshaft engine permits more facile assembly and installation in motor vehicles at a greatly reduced cost. Since the radiator is supported by the engine, the work necessary for completing many connections may be reduced at the time of installation.

While the forms of apparatus discussed herein constitute preferred embodiments of the invention, it is to be understood that the invention is not limited to these precise forms of apparatus, and that changes may be made therein without departing from the scope of the invention which is defined in the appended claims.

We claim:
1. A power unit comprising:
an engine;
a vertically oriented crankshaft operatively connected to said engine;
a radiator, operatively positioned above and substantially perpendicular to said crankshaft; and
a cooling fan, operatively connected to said crankshaft, interposed between said engine and said radiator.

2. The power unit according to claim 1 wherein said engine is of a V-type.

3. A power unit comprising:
an engine;
a vertically oriented crankshaft driven by said engine;
a radiator located in the vicinity of and supported by said engine; and
a cooling fan, operatively connected to said crankshaft, interposed between said engine and said radiator.

4. The power unit according to claim 3 wherein said engine is of a V-type.

5. The power unit according to claim 1, further comprising an air exhaust duct interposed between said radiator and said engine.

6. The power unit according to claim 5 wherein said air exhaust duct further includes a fan shroud formed integrally with the air exhaust duct.

7. The power unit according to claim 5 wherein said air exhaust duct has at least one outlet port facing radially outwardly of a horizontal plane.

8. The power unit according to claim 5 wherein said air exhaust duct comprises an upper duct portion operatively connected to a lower duct portion.

9. The power unit according to claim 5 wherein said air exhaust duct includes a carburetion air cleaner formed integrally with said exhaust duct.

10. A motor vehicle having an engine enclosure comprising:
   a crankshaft oriented vertically;
   an engine driving said crankshaft;
   a liquid-cooled radiator positioned above and supported by said engine substantially perpendicular to said crankshaft in a space defined by said enclosure; and
   a cooling fan interposed between said engine and said radiator and directly connected to said crankshaft.

11. A motor vehicle according to claim 10 wherein said engine is of a V-type.

12. A motor vehicle according to claim 10 wherein said enclosure has a top wall, a front wall and side walls and cooling air currents for cooling said radiator are introduced into the space defined by the enclosure through one of said walls of the enclosure and released into the atmosphere through said front wall of the enclosure after cooling the radiator.

13. The motor vehicle of claim 10 further comprising exhaust means, operatively connected to said radiator and said engine, for directing air pulled by said fan through said radiator toward the bottom of said enclosure and outside said enclosure such that the force created by said directed air reduces the amount of debris entering said enclosure from said bottom.

14. A motor vehicle having an engine enclosure comprising:
   a crankshaft oriented vertically;
   an engine driving said crankshaft;
   a liquid-cooled radiator positioned above and supported by said engine substantially perpendicular to said crankshaft in a space defined by said enclosure;
   a cooling fan interposed between said engine and said radiator and directly connected to said crankshaft; and
   an air exhaust duct for guiding warm air emanating from the vicinity of said radiator away from the engine, without coming in contact therewith.

15. A motor vehicle as claimed in claim 14 wherein said air exhaust duct is split into an upper duct portion and a lower duct portion, and further comprising a carburetion air cleaner split into an upper case portion and a lower case portion, said lower case portion of said cleaner being formed integrally with the upper duct portion of said air exhaust duct, and a suction passageway extending from said air cleaner to said engine through said air exhaust duct.

16. A motor vehicle as claimed in claim 14 comprising a fan shroud formed integrally with the exhaust duct.

17. A motor vehicle as claimed in claim 16 wherein said air exhaust duct comprises an upper duct portion operatively connected to a lower duct portion.

18. The power unit according to claim 1 wherein said cooling fan is mounted on the end of said crankshaft adjacent said radiator.

19. The power unit according to claim 3 wherein said cooling fan is mounted on the end of said crankshaft adjacent said radiator.

20. A power unit comprising:
   an engine;
   a vertically oriented crankshaft operatively connected to said engine;
   a radiator, operatively positioned above and substantially perpendicular to said crankshaft;
   a cooling fan, operatively connected to said crankshaft, interposed between said engine and said radiator; and
   means, operatively connected to said engine and said radiator, for supporting said radiator in position above said engine.

21. The power unit according to claim 20, further comprising enclosure means having air inlet and exhaust means formed therein for housing said engine, said radiator, and said cooling fan.

22. The motor vehicle according to claim 17 wherein said enclosure includes top, front, and side walls and said upper and lower duct portions are defined by said enclosure and a partition which extends between said fan shroud and the walls of said enclosure.

23. The motor vehicle according to claim 22 wherein said partition includes a front partition portion extending horizontally between said fan shroud and said front wall of said enclosure and a rear partition portion extending rearwardly and upwardly between said fan shroud and said top wall of said enclosure.

24. The power unit according to claim 20 wherein said supporting means comprises at least two brackets, each having one end thereof operatively connected to said engine and to said radiator.

25. The power unit according to claim 20 wherein at least four brackets are utilized to operatively connect said engine to said radiator.

26. The power unit according to claim 1 further comprising enclosure means having an inlet and exhaust means formed therein for housing said engine, said radiator, and said cooling fan.

* * * * *

UNITED STATES PATENT AND TRADEMARK OFFICE
CERTIFICATE OF CORRECTION

PATENT NO. : 4,862,981

DATED : 9-5-89

INVENTOR(S) : Fujikawa et al

It is certified that error appears in the above-identified patent and that said Letters Patent is hereby corrected as shown below:

On the title page, item [75]:
Add the name of --Lee Roy Hardesty, of Horicon Wisconsin-- after "Hitomi Miyake, Kobe all of Japan" in the list of inventors.

Signed and Sealed this

Twenty-ninth Day of May, 1990

*Attest:*

HARRY F. MANBECK, JR.

*Attesting Officer*     Commissioner of Patents and Trademarks